United States Patent [19]

Börner et al.

[11] Patent Number: 4,483,806

[45] Date of Patent: Nov. 20, 1984

[54] PROCESS FOR THE PRODUCTION OF $U_3O_8$ POWDER

[75] Inventors: Paul Börner, Freigericht; Jürgen Dübel, Grosskrotzenburg; Jürgen Hofmann, Bad Orb, all of Fed. Rep. of Germany

[73] Assignee: Nukem GmbH, Hanau, Fed. Rep. of Germany

[21] Appl. No.: 411,322

[22] Filed: Aug. 25, 1982

[30] Foreign Application Priority Data

Sep. 12, 1981 [DE] Fed. Rep. of Germany ....... 3136302

[51] Int. Cl.$^3$ .............................................. G21C 21/00
[52] U.S. Cl. ...................................... 264/0.5; 423/260
[58] Field of Search .................. 423/260, 253; 264/0.5; 419/31; 148/126.1

[56] References Cited

U.S. PATENT DOCUMENTS

| | | | |
|---|---|---|---|
| 3,140,151 | 7/1964 | Foltz et al. | 423/261 X |
| 3,167,388 | 1/1965 | Rhodes | 423/260 |
| 3,382,066 | 5/1968 | Kenney et al. | 419/31 X |
| 3,761,547 | 9/1973 | Grossman et al. | 423/260 X |
| 3,790,493 | 2/1974 | Dada et al. | 423/260 X |
| 3,803,273 | 4/1974 | Hill et al. | 423/253 X |
| 4,077,816 | 3/1978 | Nadkarni | 419/31 X |
| 4,201,738 | 5/1980 | Johnson | 264/0.5 |

FOREIGN PATENT DOCUMENTS 3024634  1/1982  Fed. Rep. of Germany.

*Primary Examiner*—Deborah L. Kyle
*Assistant Examiner*—Matthew A. Thexton
*Attorney, Agent, or Firm*—Cushman, Darby & Cushman

[57] ABSTRACT

For the operation of material-test-reactors, recently there have been considered fuels having lower degrees of enrichment in U-235. For this purpose, there is needed $U_3O_8$ powder having a crystal size of 40 to 90 μm, which is producible economically and in whose production there is developed as little secondary waste as possible and a pore-free product. For this purpose, uranium compounds of the stage of oxidation +4 to +6 are calcined in an oxygen containing atmosphere whereby the calcining is carried out above 1250° C. in an atmosphere containing more than 30 volume % oxygen.

8 Claims, No Drawings

PROCESS FOR THE PRODUCTION OF $U_3O_8$ POWDER

BACKGROUND OF THE INVENTION

The invention is directed to a process for the simple and economical production of $U_3O_8$ powder having a crystal size of 40 to 90 μm by calcining finely powdered uranium compounds of the oxidation stage +4 to +6 in an oxygen containing atmosphere at normal pressure (i.e., atmospheric pressure).

There have been efforts in operating material-test-reactors (MTR) of high degrees of uranium enrichment to switch to the use of fuels of lower degrees of enrichment of U-235. For the operation of MTR reactors having lower degrees of enrichment, however, the fuel density must be increased which becomes possible through the employment of oxidic uranium fuel materials of a specific crystal size, which preferably is between 40 and 90 μm. Previously, for the production of this type of fuel, there were employed industrially expensive processes.

Thus, for example, there is known from German OS No. 3024634 and related Hackstein U.S. application Ser. No. 274,793 filed June 18, 1981, the entire disclosure of which is hereby incorporated by reference, to produce $U_3O_8$ powder having a crystal size between 40 and 90 μm by pressing a sinterable $U_3O_8$ powder, sintering, breaking, and sieving the fine portion. Subsequently, the same process is repeated again with the large particles remaining behind on the sieve. In this procedure, the yield of particles whose size is between 40 and 90 μm is relatively low, while the main amount of the $U_3O_8$ powder is obtained as a non-utilizable fine portion.

Besides in the breaking, there is caused abrasion of the breaking tool, the abraded particles becoming an impurity in the $U_3O_8$ powder, the quality of which thus can be reduced. As a further disadvantage of this process, mention is made of the development of dust in the breaking, which dust requires a corresponding closed process and leads to accumulation of secondary waste in the waste gas purification system.

Furthermore, it is known to start from an aqueous uranyl nitrate solution which is mixed with tetrahydro-furfuryl alcohol in order to produce a gel-like solution. This gel-like solution is run in from an oscillating nozzle tip having a fixed frequency. The spherical gel droplets pulling off from the nozzle tip run through a falling zone having an $NH_3$ atmosphere and subsequently a column containing an aqueous $NH_3$ solution, at whose bottom so-called nuclei collect as small yellow spheres, which contain the uranium in the form of ammonium diuranate. These nuclei are washed with an isopropanol/water mixture, subsequently dried in a vacuum, and then calcined. Particle growth occurs in the subsequent sintering step. Through sieving, the crystals of the desired size of 40 to 90 μm can be obtained in a yield of about 70 to 80%. The fine particles and oversize particles must be rejected thereby and be reprocessed. This process, therefore, is very expensive in regard to apparatus and requires many process steps. Besides, secondary waste is produced in it in the form of aqueous, as well as isopropanol containing, ammonium nitrate solutions.

Besides, it is known to produce $U_3O_8$ powder from uranium compounds of the stage of oxidation +4 to +6 by calcining in an oxygen containing atmosphere whereby as atmosphere there is used air, and the calcining takes place at a temperature below 1100° C. A $U_3O_8$ powder having a crystal size of 40 to 90 μm, which besides should be as pore free as possible, cannot be produced in this manner.

Therefore, it was the problem of the present invention to find a process for the production of $U_3O_8$ powder having a crystal size of 40 to 90 μm by calcining of finely powdered uranium compounds of the oxidation stage +4 to +6 in an oxygen containing atmosphere at normal pressure which is economical, in which as little as possible secondary waste accumulates and which produces the most pore free crystals possible.

SUMMARY OF THE INVENTION

The problem was solved according to the invention by calcining the uranium compounds at a temperature above 1250° C. in an atmosphere containing over 30 volume % of oxygen.

Preferably, the temperature treatment is carried out at 1250° to 1550° C., advantageously in an atmosphere which contains 40 to 100 volume % of oxygen. It has proven best to use pure oxygen. The best results are obtained if the calcining is maintained for 10 to 30 hours.

For example, uranium oxide of any oxidation stage >2 which must have reactor purity but can be of any fine particle size is placed on an alumina shell and placed in a muffle furnace. This muffle furnace is connected to an oxygen flask, heated in an oxygen stream to 1500° C., and left at this temperature for about 10 to 30 hours, depending on the fineness of the starting uranium oxide.

The $U_3O_8$ crystals produced in this manner are pore free, have a BET surface area <0.1 m²/g, and have a toluene density of 8.32 to 8.34 grams/cm³, while the theoretical density is 8.39 g/cm³ and accordingly is nearly reached in the process.

In the process of the invention, the yield of $U_3O_8$ crystals having 40 to 90 μm edge length is particularly large and is above 80%, mostly even at more than 90%. The crystals which are too large and the fine portion can be separated off by sieving for reprocessing. The small amount of too large crystals after mechanical breaking can be added directly to the desired product stream for fuel, the fine portion can be supplied again directly to the process of production, so that the process ultimately operates with a nearly quantitative yield, without accumulation of secondary waste.

The process of the invention is particularly simple and economical since it operates according to a single step process, and there is not required large investments or consumption of chemicals, apart from oxygen.

Instead of employing a pure oxygen atmosphere, the temperature treatment can also be undertaken in an atmosphere which contains besides an inert gas, e.g., argon, at least 30 volume % of oxygen. However, through this a longer temperature treatment is necessary which makes this process variant more uneconomical compared to that in a pure oxygen atmosphere because of the increased time required.

It is especially surprising that, for the production of $U_3O_8$ crystals, according to the process of the invention there can be used uranium oxide having any size of starting crystal and that there can be used all uranium compounds where the uranium has an oxidation stage between +4 and +6.

With the thus produced $U_3O_8$ powder, there can also be produced $UO_2$ powder having the same crystal size of 40 to 90 μm. For this purpose, $U_3O_8$ crystals having a particle size of 40 to 90 μm are placed on a molybdenum dish, and in an end-charge-and-discharge furnace they undergo a temperature treatment between 850° and 1700° C. for about 8 to 20 hours, preferably in a hydrogen atmosphere.

After this treatment process, there are obtained $UO_2$ crystals which are the same as $U_3O_8$ crystals in their habit, and likewise are free from pores.

The process can comprise, consist essentially of, or consist of the stated steps with the recited materials.

WORKING EXAMPLE

Starting material is a $U_3O_8$-powder with a bulk density of 2,4 g/cm³ and the following powder fractions

| | |
|---|---|
| <40 μm | 86% |
| 40-90 μm | 11,5% |
| >90 μm | 2,5% |

This powder is treated at 1500° C. under a pure oxygen atmosphere.

After this treatment the powder consists of the following fractions

| | |
|---|---|
| <40 μm | 14,8% |
| 40-90 μm | 76,8% |
| >90 μm | 8,4% |

The O/U-ratio of the got product is 2.67 is the theoretical and the X-ray pattern shows too that it is pure $U_3O_8$.

What is claimed is:

1. In a process for the production of $U_3O_8$ powder having a crystal size of 40 to 90 μm by calcining a finely powdered uranium compound of the oxidation stage +4 to +6 in an oxygen containing atmosphere at normal pressure, the improvement comprising calcining the uranium compound at a temperature of at least 1250° C. in an atmosphere containing at least 30 volume % of oxygen.

2. A process for the production of $U_3O_8$ powder according to claim 1 wherein the temperature treatment is at 1250° to 1550° C.

3. A process for the production of $U_3O_8$ powder according to claim 2 wherein the temperature treatment takes place in pure oxygen.

4. A process for the production of $U_3O_8$ powder according to claim 1 wherein the temperature treatment takes place in pure oxygen.

5. A process for the production of $U_3O_8$ powder according to claim 4 wherein the temperature treatment takes place in 10 to 30 hours.

6. A process for the production of $U_3O_8$ powder according to claim 3 wherein the temperature treatment takes place in 10 to 30 hours.

7. A process for the production of $U_3O_8$ powder according to claim 2 wherein the temperature treatment takes place in 10 to 30 hours.

8. A process for the production of $U_3O_8$ powder according to claim 1 wherein the temperature treatment takes place in 10 to 30 hours.

* * * * *